March 3, 1970     I. LEWIS ET AL     3,497,967

METHOD AND APPARATUS FOR TEACHING READING

Filed April 1, 1968

INVENTORS
RUTH A. FRENCH
ISABEL LEWIS
BY Warren, Rubin, Brucker & Chickering
ATTORNEYS United States Patent Office 3,497,967
Patented Mar. 3, 1970

3,497,967
METHOD AND APPARATUS FOR TEACHING
READING
Isabel Lewis, 1942 Maybelle Drive, Pleasant Hill, Calif.
94523, and Ruth A. French, 104 Dracena Ave., Piedmont, Calif. 94611
Filed Apr. 1, 1968, Ser. No. 717,799
Int. Cl. G09b 1/34
U.S. Cl. 35—35
10 Claims

ABSTRACT OF THE DISCLOSURE

A method and apparatus for teaching reading in which a student is instructed to compare graphemes he finds in a word he reads with graphemes displayed on containers. The containers carry objects the name of which when it is pronounced includes a phoneme which corresponds to the graphemes displayed on the container. The displayed graphemes are selected to represent a linguistic series. The apparatus provides a storage structure with a storage space for each container. The spaces are arranged to position the containers closely adjacent each other.

BACKGROUND OF THE INVENTION

Field of the invention

This invention relates to teaching aids and more particularly to a teaching aid employing graphemes representing a linguistic series and objects the name of which includes a phoneme corresponding to a particular grapheme.

State of the prior art

In the past, many attempts have been made to help students increase their ability to learn and comprehend. Particular attention has been given to help children increase the speed with which they learn to read and write, their ability to comprehend written words, and their ability to translate written words into correctly pronounced speech. There are teaching aids available to teach a growing child letters, the alphabet, word and sentence structures, etc. Many of these devices are quite satisfactory and have greatly helped beginning readers in overcoming their initial difficulties.

In these various attempts, it has generally been recognized that at least one very efficient way to aid the beginning reader is to make him correlate letters with objects or graphical representations thereof, the names of which commence with the particular letter. When viewing the object or picture, he can pronounce its name and soon he begins to associate a particular letter with a particular sound. Thus, the alphabet can be taught to him relatively quickly and efficiently. By combining the letter identification process with the reading of simple, elementary words, the student is soon on his way to becoming a full-fledged reader.

The speed with which proficiency is achieved, of course, varies a great deal from student to student. Aside from fast and slow learning children, particularly with respect to the learning of reading, there is a class of children for whom it becomes exceedingly difficult, and sometimes almost impossible, to be able to read even though they might be able to distinguish and categorize the letters of the alphabet.

These children require a great deal of personal attention on the part of the teacher to advance them to a point at which they are able to read and comprehend as well as pronounce the read symbols or words. Aside from the difficulty and time element involved in teaching these children, their slow progress relative to others discourages them, has adverse effects on their willingness to learn, and generally can create serious psychological problems which may carry over for many years.

SUMMARY OF THE INVENTION

The present invention recognizes the fact that certain linguistic sequences can incorporate most phonemes which are the keys to the development of a language without it being excessive in length. By teaching the beginning reader the correlationship between graphemes and phonemes taken from the sequence, the children, and particularly the beginning reader, learn sound relationships instead of letters from the alphabet. With the relatively few elements of a linguistic sequence, say about 30 or so, a substantial stock of the most commonly found words in the language can be taught to the child. By subjecting the child over and over again to the relationship between certain graphemes, which in the context of this specification includes letters as well as letter combinations, the child can be taught to learn to read at a much faster pace then according to heretofore known and practiced methods.

It has been particularly observed that so-called retarded readers, that is those children who are substantially slower in learning to read than average children, or children who seem to make no progress at all, can be taught to read and comprehend in a relatively short period of time.

Briefly, the method for aiding and teaching students to read comprises the steps of displaying a written symbol composed of serially arranged graphemes to the student. A plurality of receptacles are arranged within reach of the student and each receptacle visibly displays a different grapheme to the student. The graphemes are selected so that their total represents a linguistic sequence. At least one object known by a common name to the student is placed in each receptacle. The object name has a linguistic relationship to the graphemes displayed on the receptacle. The student is then instructed to compare a grapheme of the word that is displayed to him with the graphemes displayed on the receptacle and to select the receptacle displaying the grapheme being compared. After he has found the particular receptacle, the student is to inspect the object in the selected receptacle and identify it. He is thereby taught to associate the object with a particular phoneme which is the verbal equivalent of the grapheme displayed on the receptacle and the compared grapheme of the word. The objects are chosen to address themselves to several of the student's senses as, for example, his visual sense and his tactile sense. If desired others, such as his audible sense, can, of course, be addressed. The latter, however, makes the device substantially more complicated and costly and somewhat distracts from the appealing simplicity of apparatus constructed according to the present invention.

At first the process is slow and tedious but interesting to the student since he works, or plays with objects of interest to him, such as animals, foods, and toys. Each time he finds the corresponding toy, he is given a clue to the pronunciation of the grapheme he looked up. Initially, he might have to search for several graphemes before he can comprehend a written word. His skill, however, increases rapidly and after relatively short periods of time, he might be able to identify and comprehend a full word with the selection of only one grapheme.

Thus, instead of teaching a student to combine many letters into a word which, in the particular surroundings, makes sense, he is taught to select certain letters and combinations of letters, compare these letters or combinations thereof with the graphemes of the linguistic sequence; and, upon having found the corresponding grapheme, he is given a clue to the phonetic equivalent of the grapheme. The student is not forced to correlate certain letters and combinations of letters to certain sounds, which is neither easy, since it requires a well trained memory, nor logical, since the phonetic equivalent to a combination of two or more letters has no logical relationship to the phonetic equivalent of each of the letters. The present invention employs the most frequently recurring sounds of the language, symbolizes them in the form of graphemes, and teaches the student to recognize the phonetic equivalent to a graphic symbolization by confronting him with known objects and injecting a certain amount of labor and play into his learning process.

Observation of children employing this method has shown most encouraging results. Not only do the children increase the pace at which they learn to comprehend the meaning of and recognize the phonetic equivalent of a written word, but the teaching method has provided to be play rather than study for the younger reader. He considers the method to be joy rather than work which gives him an added incentive to work on it and increase his ability to master the game. The improvement in reading skill was observed to be particularly striking with those children who had to be regarded as overly slow or retarded learners.

To facilitate the ease with which the student can follow the instructions and obtain the object which gives him a clue to the phonetic equivalent to a particular grapheme, the containers carrying the objects are arranged closely adjacent each other within reach of the student. This invention also provides apparatus therefor; and, briefly, such apparatus comprises a plurality of receptacles which are placed in storage spaces of a storage structure. The storage spaces are arranged closely adjacent each other, and each receptacle is provided with a different grapheme visibly displayed thereon. Each grapheme is selected to represent a different member of a particular linguistic sequence. At least one object is disposed in each of the receptacles and each such object manifests a linguistic relationship to the grapheme displayed thereon. By observation and experience, the student associates the particular grapheme with the object or objects in the receptacle and therefrom with the particular phoneme corresponding to the displayed grapheme.

In the presently preferred form of this invention, the storage structure is a cabinet and the receptacles are drawers slideably disposed therein. At least a portion of each drawer is visible from the exterior of the cabinet, and such portion is transparent to enable the students to view the objects without having to remove the drawer from the cabinet.

This apparatus is compact, inexpensive and attractive for the children to work with. Its small size enables a relatively large number of the cabinets to be used simultaneously in a classroom, for example, without causing disturbances or loss of the teacher's control over the children due to distraction that could occur from the presence of large objects in the classroom.

DESCRIPTION OF THE PREFERRED EMBODIMENTS

Figure 1:
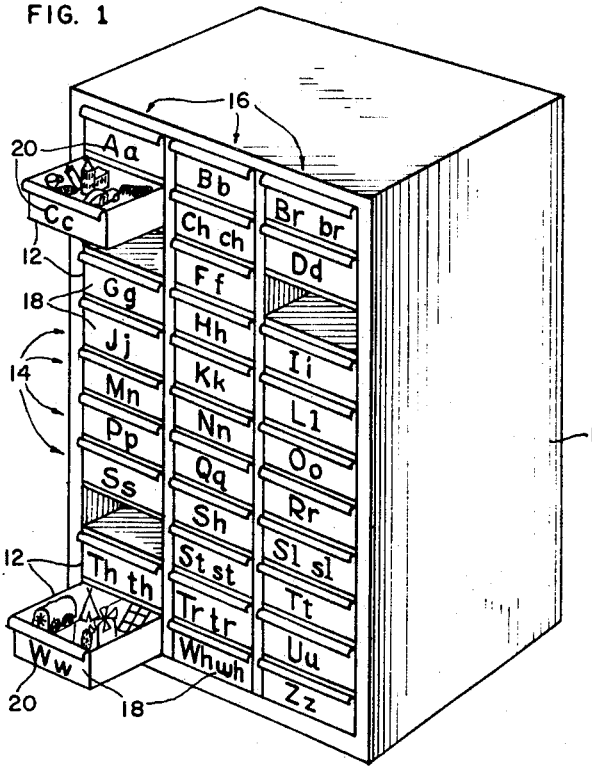
FIGURE 1 is a perspective view of a grapheme-displaying apparatus constructed according to the present invention.
Figure 3:
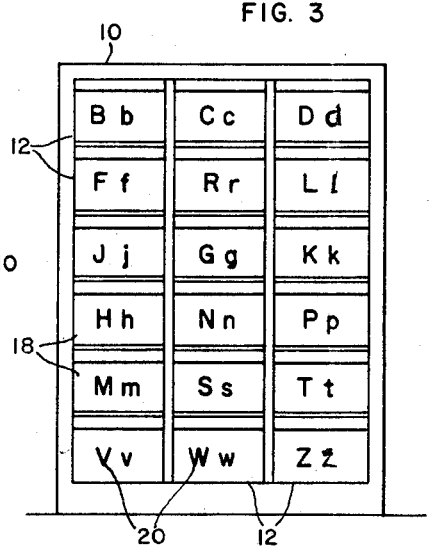
FIGURE 3 is a front elevational view of a grapheme-displaying apparatus constructed for use with a shorter linguistic sequence.

Referring to FIGURES 1 and 3, a support structure or cabinet 10 includes a plurality of storage spaces for slideably receiving drawers 12. The drawers are arranged in rows 14 and banks 16 to position the drawers closely adjacent each other. A front panel 18 of each drawer is preferably constructed of a transparent material, such as glass or plastic, to make interior portions of the drawers visible from the exterior of the cabinet.

Front panel 18 of each drawer displays a different grapheme 20, all of the graphemes together representing a particular linguistic sequence. A linguistic sequence represents the phonemes which are the keys to the development of a language. A large number of such sequences are known, each having particular advantages and directed to attain particular objectives. Thus, the number of drawers equals the number of phonemes which are included in the particular linguistic sequence chosen.

The most satisfactory linguistic sequence accomplishes two objectives. First, it includes the phonemes which most frequently occur in the language being taught. In English, such phonemes may be the letters A, B, F, H, L, P, R, etc., and the letter combinations CH, SH, TH, TR, etc. Secondly, the chosen phonemes should be the more difficult ones of the frequently occuring phonemes and provide a bridge between themselves and those phonemes of the language which are not displayed on any of the drawers. It is important that the teaching device continues to aid the learning student beyond that which is actually displayed. At this point, particular consideration is directed to the bridging qualities of the chosen sequence.

A linguistic series has bridging qualities of the chosen phonemes help the student not only to identify the phonetic equivalent for a given grapheme but also help him to decode those graphemes which do not belong to the series and are therefore not displayed on any of the drawers of the cabinet. The greater the bridging ability of the chosen graphemes, the better adapted is the sequence for the purposes contemplated herein. One linguistic sequence with which excellent results have been obtained with the present invention can be found in "The Linguistic Readers" published by Harper and Row. That sequence consists of 30 phonemes some of which have been enumerated above.

Figure 2:
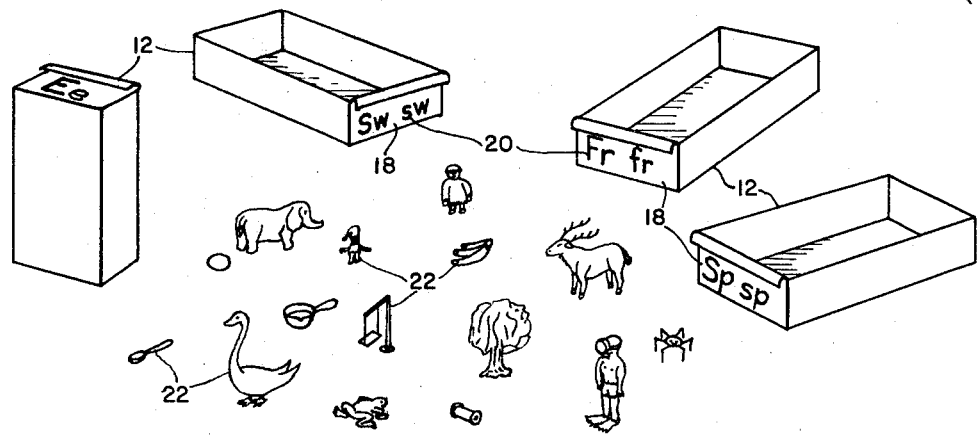
FIGURE 2 is a perspective view of a plurality of containers and objects disposed therein.

Referring to FIGURE 2, at least one but preferably several objects 22 are disposed in each drawer 12. The objects must be carefully selected to be relatively simple, noun-identified, and known by the student using the device so that he can identify the object and pronounce its name. Thus, for use with school-age children, the drawer displaying the grapheme A may contain an apple, an airplane, an alligator, an anchor, etc. while the drawer labeled T might include a tiger, teeth, a tent, tire, or a telephone. Of course, to make the device small and compact, all objects are models of what they actually represent and are reduced in scale. It will be noted that each object contained in a particular receptacle starts with a phoneme which corresponds to the grapheme displayed on the container. Thus, if a student views or touches the object and pronounces its name, he automatically pronounces the phonetic equivalent of the displayed grapheme. Since he knows that the object starts with the phonemes which corresponds to the grapheme, he is given a key to decoding, in phonetic terms, that which the grapheme symbolizes.

The actual objects placed in the drawers may very will differ from age group to age group, from the sex of the particular student, their social background, etc. For best results, they should always be those objects with which the student is most familiar. In a long series of tests and observations and employing the above referred to linguistics series by Harper and Row, the following objects showed best results when placed in the receptacles marked with the corresponding grapheme:

| A | a |
|---|---|
| apple | axe |
| airplane | antlers |
| alligator | ash tray |
| anchor | abacus |
| ant | |

5

B b ball
bear
boat
bell
bat (ball)
bat (animal)
bottle
bee
button
bead
banana
boot
balloon
bow
bed
baby
box
basket barn
bulb
bug
bun
bag
bamboo
bicycle
bone
bobby pin
band aid
Bat Man
beetle
Beatle
book
bird
bus
bib brush
bride
brick

Br br broom
brown
bread

C c cat
car
carmel
cow
cup
comb
cowboy
candle
cotton calendar
calf
colt
candy
castle
camera
cap
corn

Ch ch chair
checker
church
chain
chicken
chalk
chipmunk chest
cheese
cherry
chin
chimney
Chinaman
chinese doll

D d dog
deer
duck
donkey
desk
doughnut
dish doll
dime
domino
door
dice
dinosaur
dollar

Dr dr drum
dropper
dress
dragon drop
drumstick (music)
drumstick (chicken)

E e elephant
egg
elf

Eskimo
elk
elm tree

F f fish
football
fan
fork
fence
fire
firearm
fire engine
finger face
fox
four
five
farmer
feet
foot
fish
feather frog
fruit goat
gun
gum
goose
guitar
golf club horse
hat
holster
helmet
house
heart
hen
hammer
hamburger Indiana
igloo
insect jeep
jug
jet
jacks
jar kangaroo
key
kite
kitten
keg lion
lock
ladder
leopard
log
license
leg monkey
man
mouse
marble
matches
magnet
milk
motor cycle nest
nut
nail (iron)
nail (finger)
needle octopus
ostrich
olive
ox

6

Fr fr frying pan

G g gorilla
gold
girl
gas pump
gate
garage

H h horseshoe
hippopotamus
horned toad
hunter
horn (cow)
horn (music)
hill
hook

I i ink
inch

J j jam
jelly
jack-o-lantern
jack-in-a-box

K k kettle
kitchen
ketchup
kilt
king

L l lizard
lamp
lamb
lobster
lid
leaf
lollipop

M m moon
magnifying glass
meat
mouth
mask
milkman
map
mop

N n nine
nose
nickel
neck

O o orange
otter
onion

P p pig
piano
pan
pirate
pump
pumpkin
pistol
perfume
paper
paper clip
pencil
pin
polar bear penny
poodle
play pen
pine tree
palm tree
picture
pen
pail
pancake
pear
pillow
potato

Q q queen
quarter
quilt
quiver

Quaker
question mark
quart

R r rabbit
rooster
rifle
rat
rocket
rug
record
rattle
rocker
racer rose
red
rubber band
rattlesnake
ring
rock
raft
rope
radio

S s soap
seal
seed
sock
six
seven
saddle
Santa sailor
sail boat
soldier
skunk
squirrel
scissors
saw

Sh sh shoe
sheep
shark
ship
shell (sea)
shell (gun)

shirt
shawl
shower
shelf
sheet (paper)
shovel

Sl sl sled
slipper slide
slot machine

Sp sp spoon
spool spider

St st star
star fish
stool
stork
steering wheel stump
stocking
stamp
strawberry

Sw sw swing
swan swimmer

T t tiger
teeth
tub
ten
top
tent
tire
telephone turkey
turtle
towel
tie
tooth
toothbrush
table thimble
thermometer
thumb
thermos
thirteen

Th th thistle
thorn
three
thread
throat truck
trumpet
tree
trailer

Tr tr tractor
train
tray umbrella
umpire

U u usher
ugly wagon
watch
witch
well
windmill
watermelon
worm
walrus

W w water can
woman
wolf
window
wing
web
wall
wigwam wheel
whip
whale

Wh wh whistle
wheat
wheelbarrow zebra
zipper
zero

Z z zoo
zeppelin

Of course, only certain of the objects on this list are placed in a drawer. They are selected so as to correspond best to the knowledge, experience, background, etc. of the student.

The actual teaching process and method is as follows. The student is given a particular written word to read. A cabinet 10 with the drawers 12 displaying the graphemes 20 is placed adjacent the student and he is asked to compare the first grapheme he encounters in the word with the graphemes displayed on the drawers of the cabinet. This grapheme may be composed of one or two letters, if the linguistic sequence is the above-referred to Harper and Row sequence or, if another sequence is chosen, it may even comprise more than two letters. Upon locating the desired graphemer, the student views the objects 22 contained in the corresponding drawer by removing the drawer and touching or holding the objects, or by simply looking through the transparent front panel 18. Pronunciation of the name of the object he holds in his hand, or views automatically provides him with the phonetic equivalent of the displayed grapheme as described above. The student now goes on to the next grapheme of the word and so forth until he has deciphered the word, can pronounce it, and comprehends what it stands for. After the student has performed this exercise many times he begins to automatically associate a particular grapheme with the corresponding phonetic equivalent. Thus, his need to consult the cabinet to give him the necessary clue for deciphering the word decreases with time.

After the student has mastered his initial difficulties, the words he is given to read can become more difficult and include graphemes which are not displayed on the cabinet. His experience in decoding the now known graphemes helps him in decoding graphemes which are not displayed on the cabinet. His initial learning begins to snowball and his reading ability begins at an increasingly faster pace to increase. During the transitional stage, particularly at the beginning thereof, he needs the help and advice of a teacher to show him how to decode graphemes which are not displayed. At that point, however, he already has substantial experience in reading and his progress from thereon is substantially faster than had he initially been taught according to one of the heretofore known methods.

Aside from recognizing the sound-symbol relationship, the student learns to organize language patterns, improve his hand-eye coordination, learns spelling and alphabetizing, begins to recognize sentence patterns, and so forth.

Improved results have been obtained by not only placing objects into the drawers of the cabinet which have the desired linguistic relationship to the displayed grapheme, but by additionally providing the objects in the drawer with different surfaces to create different tactile sensations for the student. Observations have shown that there are many students who are very perceptive to tactile sensations, possibly even more so then to sensations of the eye, so that a particular student might remember objects with a certain surface such as a soft, hard, fuzzy, smooth, etc. surface better than others. This, in turn, helps to decrease the length of time during which he must always consult the cabinet for decoding a particular grapheme since he is able to associate a grapheme with a particular phoneme more quickly.

Observations have also shown that the students' tactile sense can be advantageously employed by constructing the graphemes 20 displayed on drawers 12 of a material which has the same surface characteristic as the objects contained in that drawer. In this instance, all objects in the drawer have the same surface characteristics as the surface characteristic of the grapheme displayed outside. Thus, a multisensory impact increases the learning of the student.

The present invention can also be employed as diagnostic device for determining the auditory perception of a student. The student is asked to remove from an assortment of objects that one that can be associated with a given word. Given the word "fox" for example, and an assortment of objects consisting of a fish, a box, a pirate and a cat, one would hope, of course, that the subject removes the fish since the "f" of "fish" associates with the "f" of "fox." The student might, however, remove the box which means that he associates the after sound, or the ending sound, of the word with the selected object rather than the beginning sound. This gives the skilled teacher insight into the auditory problem of the student. If the student selects the pirate or a similarly disparate object consistently, then it should be apparent that the student does not hear the sound at all. This enables a teacher to determine the sounds with which the student has difficulties and is a helpful tool in finding where to start the remedial work.

We claim:
1. A linguistic teaching device for aiding a student to correlate selectively certain graphemes with certain phonemes by subjecting the student to a plurality of sensory impressions for correlating selectively the certain graphemes to the certain phonemes, the device comprising:
   (a) a plurality of receptacles;
   (b) a storage structure providing a storage space for each receptacle, the storage spaces being arranged closely adjacent each other;
   (c) a different grapheme displayed on each receptacle, the graphemes being selected so that their total represents a linguistic sequence, and
   (d) at least one object in each of the receptacles, the name of the object having a linguisitic relationship to the grapheme displayed on the receptacle so that the student associates a particular grapheme with the object in the receptacle and therefrom with the particular phoneme corresponding to the displayed grapheme.

2. A device according to claim 1, wherein the storage structure is a cabinet and the receptacles are slideable drawers disposed in the cabinet.

3. A device according to claim 2, wherein the drawers are disposed in rows and banks.

4. A device according to claim 3, wherein at least a portion of each of the drawers visible from the exterior of the cabinet is transparent.

5. A device according to claim 1, wherein there are a plurality of objects in the receptacles, different objects in each receptacle giving different tactile sensations to the student.

6. A device according to claim 1, wherein the graphemes displayed on a receptacle and the object disposed therein are constructed of materials giving like tactile sensations.

7. A method for aiding in teaching a student to read comprising the steps of:
   (a) displaying a written word to the student, the word being composed of serially arranged graphemes;
   (b) arranging a plurality of receptacles adjacent the student, each receptacle visibly displaying a different grapheme to the student, the graphemes being selected so that their total represents a linguistic sequence;
   (c) placing at least one object known by name to the student in each receptacle, the name of the object having a linguistic relationship to the grapheme displayed on the receptacle,
   (d) instructing the student to compare a grapheme of said word with the graphemes displayed on the receptacles and to select the receptacle displaying the grapheme being compared, and
   (e) instructing the student to inspect the object in the selected receptacle and identify it so that the student associates the object with a particular phoneme which is the phonetic equivalent of the grapheme displayed on the receptacle and the compared grapheme of said word.

8. A method according to claim 7, wherein the student is instructed to identify the object by visually inspecting it.

9. A method according to claim 7, wherein the student is instructed to identify the object by visually inspecting it and by touching it to obtain a tactile sensation of the object.

10. A method according to claim 9, wherein the graphemes displayed on the receptacles and an object disposed therein are constructed of materials giving like tactile sensations and wherein the student is instructed to compare the tactile sensations of the grapheme displayed on the receptacle and the object disposed therein.

References Cited

UNITED STATES PATENTS

| | | | |
|---|---|---|---|
| 1,269,384 | 6/1918 | Campbell | 35—60 |
| 2,361,154 | 10/1944 | Schoolfield | 35—35.8 |
| 2,890,527 | 6/1959 | Benditt | 35—8 |

EUGENE R. CAPOZIO, Primary Examiner

W. H. GRIEB, Assistant Examiner

U.S. Cl. X.R.

35—60

UNITED STATES PATENT OFFICE
CERTIFICATE OF CORRECTION

Patent No. 3,497,967

March 3, 1970

Isabel Lewis et al.

It is certified that error appears in the above identified patent and that said Letters Patent are hereby corrected as shown below:

Column 3, line 15, "provided" should read -- proved --. Column 8, line 49, "graphemer" should read -- grapheme --.

Signed and sealed this 29th day of December 1970.

(SEAL)
Attest:

Edward M. Fletcher, Jr.
Attesting Officer

WILLIAM E. SCHUYLER, JR.
Commissioner of Patents